DIGITAL PHASE-LOCKED LOOP

Filed Oct. 10, 1967

INVENTORS G. P. PASTERNACK
R. L. WHALIN
BY R C Lipton
ATTORNEY

United States Patent Office 3,449,691

Patented June 10, 1969

3,449,691

DIGITAL PHASE-LOCKED LOOP

Gerald P. Pasternack, Matawan, and Ronald L. Whalin, Ocean Township, Monmouth County, N.J., assignors to Bell Telephone Laboratories, Incorporated, Murray Hill and Berkeley Heights, N.J., a corporation of New York Filed Oct. 10, 1967, Ser. No. 674,311
Int. Cl. H03b 3/06
U.S. Cl. 331—18 8 Claims

ABSTRACT OF THE DISCLOSURE

A voltage controlled pulse generator composed entirely of digital logic circuits is directly connected to the binary signal output of an EXCLUSIVE-OR phase comparator in a phase-locked loop. The pulse generator counts clock pulses provided by a plurality of sources having different pulse repetition rates and produces an output which is dependent on the clock pulse count. The binary output of the comparator selectively gates the clock sources to produce a clock count proportional to the average amplitude of the binary signal. To obtain a response to a step in frequency of the input signal obeying an *n*th order linear difference equation, the generator includes *n* counters which successively accumulate clock pulses for *n* successive signal cycles.

*Field of the invention*

This invention relates to frequency selective circuits which automatically lock the phase of a wave generator to the phase of an incoming signal and, more particularly, to phase-locked loops for providing the phase lock function.

*Description of the prior art*

Phase-locked loops, which are sometimes called locked oscillators, have many uses. A summary of the uses of phase-locked loops is discussed in Bell System Technical Journal, vol. 41, No. 2, March 1962, pages 559–602, "Properties and Design of the Phase-Controlled Oscillator With a Sawtooth Comparator," by C. J. Byrne. The phase-locked loop can also be utilized as an FM demodulator, as disclosed in Bell System Technical Journal, vol. 44, No. 5, May–June 1965, pages 823–870, "Miniaturized RC Filters Using Phase-Locked Loop," by G. S. Moshytz.

In general, the loop consists of a wave generator, which is arranged to function as a voltage controlled oscillator, and a phase comparator connected in a loop with the oscillator. When the loop operates as an FM demodulator, the signal to be demodulated is applied with the output of the oscillator to the phase comparator. The comparator output, whose amplitude defines the difference in phase between the inputs, is applied through a low-pass filter and returned to the input of the voltage controlled oscillator. The output frequency of the oscillator is, therefore, modified by the average amplitude of the phase error signal until a phase-lock is obtained, locking, in turn, the the frequency of the oscillator. Since the phase error signal amplitude is proportional to the oscillator frequency which is phase-locked to the incoming signal, the circuit provides FM demodulation.

When the incoming signal to be demodulated is a digital data signal, simple and inexpensive phase comparators can be employed. One such comparator is the EXCLUSIVE-OR circuit which, in response to digital signals, generates a binary signal output whose average amplitude is proportional to the phase error. This error signal is then filtered, as in the conventional case, for application to the oscillator.

It is advantageous, in frequency selective circuits, to eliminate magnetic components. This permits miniaturization through integrated circuitry, minimizing component cost and deterioration. In the case of the phase-locked loop, it has been suggested that RC filters be used to substitute for the magnetic components in the filter and the oscillator. These arrangements, however, are difficult to design to obtain characteristics inherent in magnetic components such as, for example, the design of a loop having a response to a step in frequency obeying an *n*th order linear equation.

Accordingly, it is an object of this invention to eliminate magnetic components in a phase-locked loop.

It is an other object of this invention to eliminate the low-pass filter in the loop.

It is a further object of this invention to provide a phase-locked loop having a response obeying a linear *n*th order equation.

*Summary of the invention*

In general, this invention contemplates a voltage controlled wave generator which is capable of being controlled directly by a binary signal, such as the output of a linear phase comparator, whereby the conventional intermediate low-pass filter is eliminated. The generator achieves this capability by being composed entirely of digital logic circuits.

It is a feature of this invention that the voltage controlled generator counts clock pulses having variable pulse repetition rates which are controlled by binary signals. Specifically, one binary condition results in a high clock rate while the other condition results in a low clock rate or, alternatively, a blockage of the clock pulses. The number of clock pulses for any time interval is, therefore, proportional to the average amplitude of the binary signal. The output of the generator is dependent on the clock pulse count. Thus, the output frequency of the generator is proportional to the clock rate which is, in turn, proportional to the phase difference between the generator output and the incoming signal.

It is another feature of this invention that *n* counters are employed in the voltage controlled generator to obtain a response in the loop obeying an *n*th order linear difference equation. After each cycle of the comparator signal, the count in each counter is transferred to the next successive counter whereby the final counter accumulates a count proportional to the average amplitude of *n* cycles of the signal.

The foregoing and other objects and features of this invention will be more fully understood from the following description of an illustrative embodiment taken in conjunction with the accompanying drawings.

*Detailed description*

Figure 1:
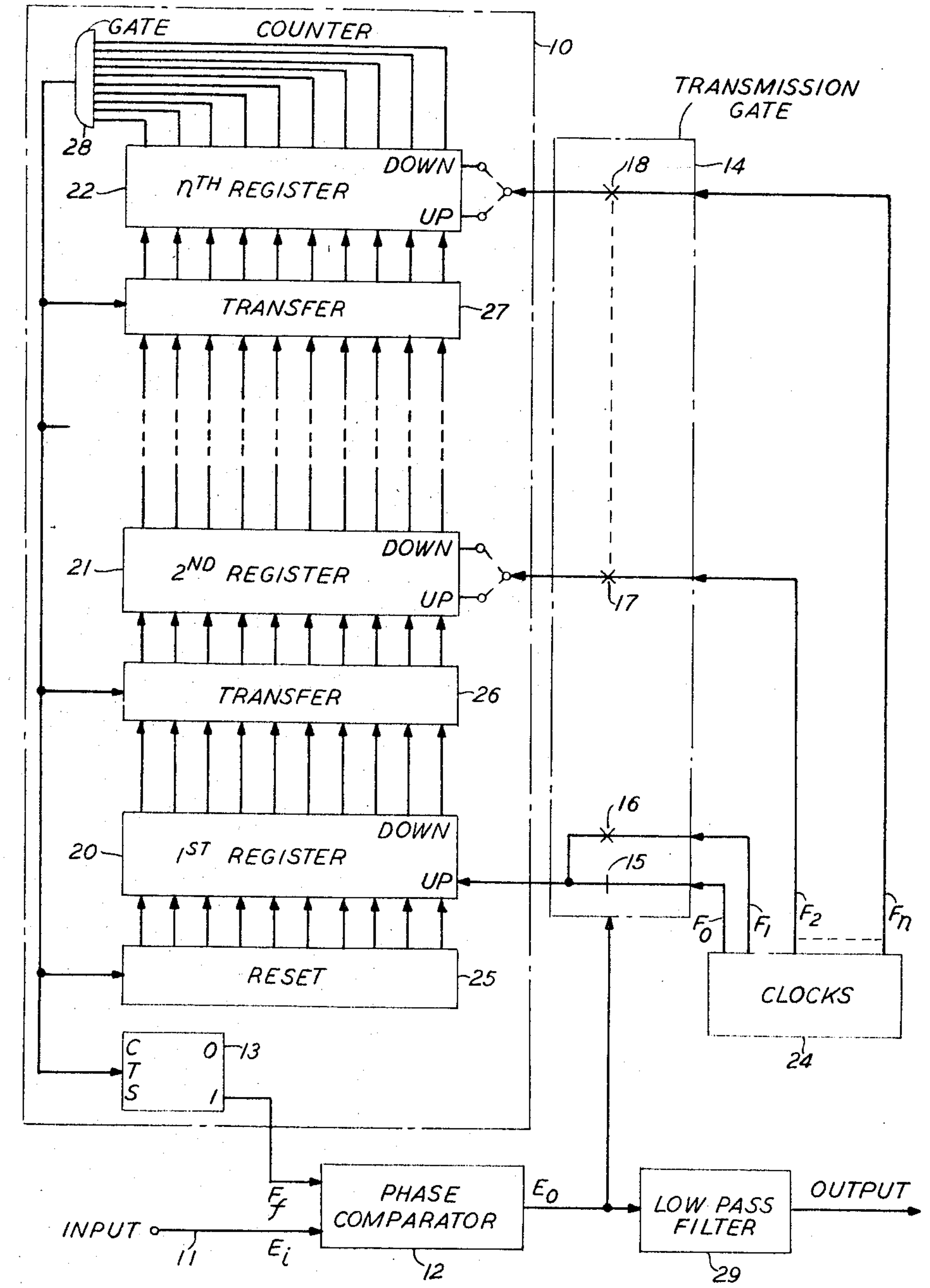
FIG. 1 discloses in block form a phase-locked loop in accordance with this invention having a response obeying an *n*th order linear difference equation.

Referring now to FIG. 1, showing an *n*th order phase-locked loop, incoming signals are received on input line 11. The incoming signals are frequency shift data signals which assume one of two frequencies, indicating the reception of either mark or space data signals. These signals are passed through a limiter, not shown, whereby a square-topped voltage wave, such as wave $E_i$ shown in FIG. 2, appears on input line 11. Line 11 extends to phase comparator 12, which is part of a phase-locked loop.

The phase-locked loop of the present invention generally includes phase comparator 12 and a plurality of sources of clock pulses, generally indicated by block 24, each source providing clock pulses having a different repetition rate. The phase-locked loop also includes a transmission gate, generally indicated by block 14, and a counter, generally indicated by block 10.

As described hereinafter, the output of the counter comprises a square-topped voltage wave shown as wave $E_f$ in FIG. 2. Wave $E_f$ and input wave $E_i$ are both applied to phase comparator 12. Phase comparator 12 is advantageously an EXCLUSIVE-OR circuit which provides a binary output. This output signal is high when either one or the other of the input signals $E_f$ and $E_i$ is high and is low when both input signals are either high or low. Accordingly, the output of phase comparator 12 is a square-topped voltage signal wave shown as wave $E_o$ in FIG. 2.

It will be shown hereinafter that the frequency of voltage wave $E_f$ is proportional to the average voltage amplitude of wave $E_o$. It will further be shown that wave $E_f$ and wave $E_i$ will be phase-locked ultimately. Accordingly, the average voltage of wave $E_o$ is directly proportional to the input frequency of wave $E_i$. Wave $E_o$ is passed through low-pass filter 29 to provide an output signal. This output signal, through the action of filter 29, is a wave having a varying voltage amplitude proportional to the frequency of input signal wave $E_i$. The phase-locked loop thus acts as a frequency discriminator.

In the phase-locked loop, clock source 24 provides a plurality of clock signals having various clock frequencies. The relationship of these clock signals will be discussed hereinafter. These clock signals are applied to leads $F_0$ through $F_n$ and then to transmission gate 14. It is noted that the clock signals applied to leads $F_0$ through $F_n$ have pulse repetition rates of $f_0$ through $f_n$ repectively.

Transmission gate 14 may comprise an electronic gate which functions to pass clock signal lead $F_0$ to counter 10 when phase comparator signal wave $E_o$ is in the low voltage signal condition. As disclosed in FIG. 1, clock signal lead $F_0$ is passed through normally closed contacts 15 to counter 10. An electronic means showing in detail how the clock signal may be gated is disclosed in detail hereinafter. Transmission gate 14 is also arranged to pass clock leads $F_1$ through $F_n$ to counter 10 by way of normally open contacts 16 through 18 when signal wave $E_o$ is in the high voltage condition.

Counter 10 comprises *n* registers, wherein registers 20 through 22 are shown, flip-flop 13, reset circuit 25, transfer gates 26 and 27 and AND gate 28. In general, the function of counter 10 is to provide an output wave whose frequency is proportional to the average voltage of wave $E_o$. This is provided by selectively gating clock pulses from clock source 24 to counter 10 under the control of signal wave $E_o$, by counting the clock pulses in a manner described hereinafter, and by generating the output wave under control of the clock pulse count.

Figure 2:
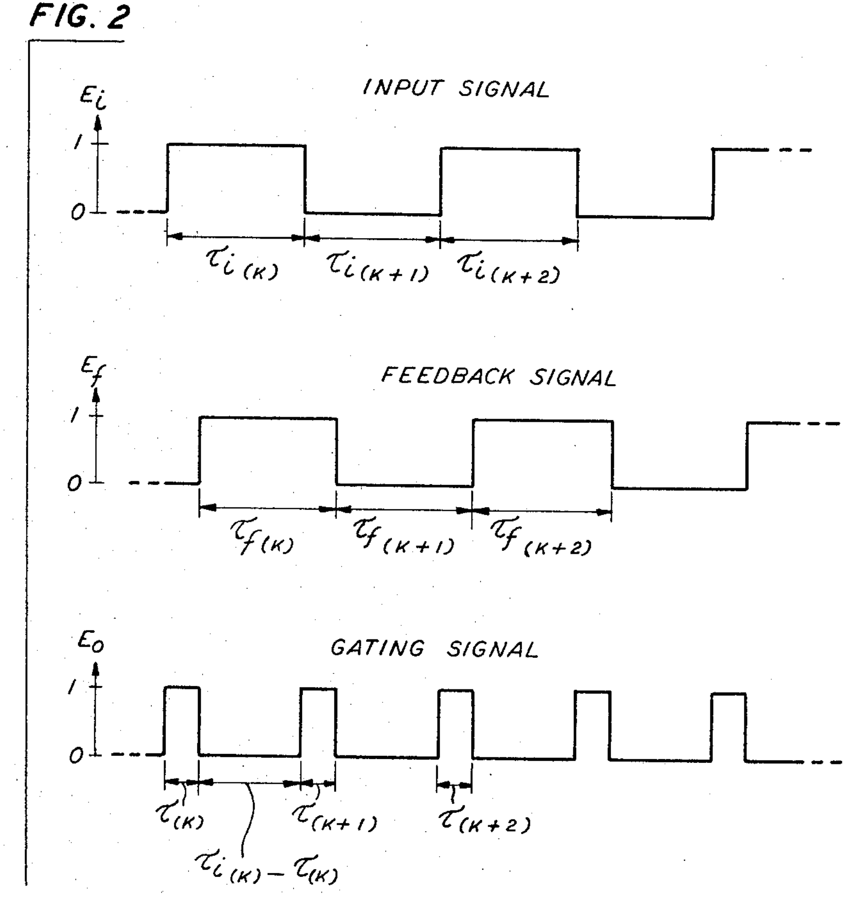
FIG. 2 shows the several waveforms corresponding to the characteristics of the phase-locked loop shown in FIG. 1.

Considering now the input signal applied to input lead 11 and shown as wave $E_i$ in FIG. 2, the first half cycle appearing on FIG. 2 can be considered the half cycle $k$ in the wave. This half cycle has a high voltage condition and has a duration, in time, expressed as $$\tau_{i(k)} \qquad (1)$$

The next half cycle, that is, half cycle $k+1$, has a low voltage condition and occupies an interval of $$\tau_{i(k+1)} \qquad (2)$$

Concurrently it may be assumed that a feedback signal shown as signal wave $E_f$ is applied by counter 10 to phase comparator 12. The first half cycle $k$ of signal wave $E_f$ shown in FIG. 2 has a high voltage condition and occupies interval $$\tau_{f(k)} \qquad (3)$$

while the next half cycle $k+1$ has a low condition and has a time interval of $$\tau_{f(k+1)} \qquad (4)$$

As a result of the application of signal wave $E_i$ and signal wave $E_f$ to phase comparator 12, output signal wave $E_o$ is developed. During the latter portion of cycle $k$ of wave $E_o$, wave $E_i$ is in half cycle $k$ and thus in the high voltage condition and wave $E_o$ is in half cycle $k$ and also in the high voltage condition. Wave $E_o$ thus goes to the low voltage condition, as shown in FIG. 2, for an interval of time expressed as $$\tau_{i(k)} - \tau_{(k)} \qquad (5)$$

During the initial portion of cycle $k+1$ of wave $E_o$, wave $E_i$ is in the initial portion of half cycle $k+1$ and thus in the low voltage condition and wave $E_f$ is in cycle $k$ and in the high condition, whereby wave $E_o$ goes to the high voltage condition for an interval expressed as $$\tau_{(k+1)} \qquad (6)$$

Similarly, it is seen that signal wave $E_o$ has a high voltage condition during one portion of each half cycle of signal wave $E_i$ and has a low condition during the other portion of each half cycle of signal wave $E_i$. The time period in which the condition of signal wave $E_o$ is high during each half cycle of signal wave $E_i$ relative to the time period during which wave $E_o$ is low is directly related to the phase difference between wave $E_i$ and wave $E_f$. It is apparent that when the phase of signal wave $E_f$ leads or lags the phase of signal wave $E_i$ by 90 degrees, then the time interval wherein signal wave $E_o$ is high is equal to the time interval wherein the wave is low. If the frequency of wave $E_i$ is changed, wave $E_f$ tends to lead or lag the phase of wave $E_i$ by more than 90 degrees. This changes the time interval when wave $E_o$ is high, thereby changing the average voltage amplitude of wave $E_o$. Accordingly, it is apparent that if the frequency of $E_i$ changes, causing feedback signal $E_f$ to further lead or lag in phase, the average voltage of wave $E_o$ correspondingly changes. It will be shown, hereafter, that the present invention is capable of locking the phase of wave $E_f$ to lead or lag wave $E_i$ by any fixed degree between 0 degrees and 180 degrees in accordance with the frequency of the incoming wave.

Considering now the latter portion of cycle $k$ of signal wave $E_o$, the low condition of wave $E_o$ is passed to transmission gate 14 for the interval defined in Expression 5. This enables gate 14 to pass clock pulses on lead $F_0$ through contacts 15 to register 20. During the initial portion of cycle $k+1$ of wave $E_o$, a high condition is passed to transmission gate 14 for the interval defined in Expression 6. This enables gate 14 to pass clock pulses on lead $F_1$ through contacts 16 to register 20. Thus, register 20 has stored therein a count of the sum of the clock pulses passed through gate 14 from clock leads $F_1$ and $F_0$. It will be shown hereinafter that the frequency $f_1$ of the clock pulses on lead $F_1$ is higher than the frequency $f_0$ of the clock pulses on lead $F_0$. Accordingly, the number registered in register 20 will be relatively smaller if the phase lag of wave $E_f$ increases and the number will be relatively larger if the phase lag decreases.

As described hereinafter, half cycle $k$ of wave $E_f$ is terminated by an output pulse from AND gate 28. This output pulse is passed to transfer gates 26 and 27 and the transfer gates intermediate thereto, which are not shown. In addition, the pulse from gate 28 is applied to the toggle input of flip-flop 13 and to reset circuit 25.

It was initially assumed that wave $E_f$ is in the high condition. This wave is derived from the "1" output of flip-flop 13. Thus, flip-flop 13 is in the set condition during half cycle $k$ of wave $E_f$. The output pulse of gate 28, applied to the toggle input of flip-flop 13, places the flip-flop in the clear condition. Accordingly, output wave $E_f$ goes to the low condition, initiating half cycle $k+1$. With wave $E_f$ in the low condition and with wave $E_i$ also in the low condition, since it is during half cycle $k+1$, the output of the phase comparator 12 goes low. Accordingly, wave $E_o$ goes to the low condition and transmission gate 14 opens lead $F_1$ and re-extends lead $F_0$ to counter 20.

The application of the pulse from gate 28 to transfer circuit 26 transfers the count in register 20 to register 21. Concurrently, the pulse from gate 28 is applied to reset circuit 25 and register 20 is reset to its initial condition. Thus, at this time the count of the sum of the clock pulses is transferred from register 20 to register 21, register 20 is reset and output wave $E_f$ goes to the low condition.

At the termination of half cycle $k+1$ of input wave $E_i$ the input lead goes to the high condition. With wave $E_f$ in the low condition, the output of phase comparator 12 goes high. This initiates cycle $k+2$ of wave $E_o$. It is noted that prior to this interval register 20 is preparing a count of the clock pulses, indicating the difference in phase between wave $E_i$ and $E_f$ in the same manner as previously described for the previous half wave. It is thus seen that this circuit is providing counts for each successive half wave in register 20.

Returning now to the initiation of cycle $k+2$ of wave $E_o$, the the application of the high condition to transmission gate 14 results in the extension of lead $F_2$ through contacts 17 to register 21. It is seen that lead $F_2$ is optionally strapped to the down count or up count of the input terminal of register 21. The determination as to whether the clock pulses on lead $F_2$ provide a down count of the number transferred from register 20 or an up count is disclosed hereinafter. In any event, upon the initiation of cycle $k+2$ of wave $E_o$, clock pulses on lead $F_2$ are passed to counter 21 whereby an additional summing is provided, in this case with clock pulses having a frequency $f_2$.

The clock pulses from lead $F_2$ continue to pass to register 21 until the next pulse from gate 28 is generated. This next pulse returns flip-flop 13 to the set condition, whereby wave $E_f$ goes high and half cycle $k+2$ of wave $E_f$ is initiated. With wave $E_f$ high and wave $E_i$ high, output signal wave $E_o$ of phase comparator 12 goes low. At the same time the gate pulse from gate 28 transfers the count from register 21 to the next successive register, concurrently transfers the count from register 20 to register 21, and resets register 20, as previously described. Thus, register 21 passes a count which comprises the original count transferred by register 20 modified by clock pulses from lead $F_2$ during cycle $k+2$ of wave $E_o$ for an interval expressed as $$\tau_{(k+2)} \qquad (7)$$

Since this time period is proportional to the difference in phase between wave $E_i$ and wave $E_f$, the count transferred by register 21 is similarly dependent on the difference in phase between the two waves.

In a similar manner the count from each register is transferred to each subsequent register, being modified in each register in accordance with the difference in phase of wave $E_i$ and wave $E_f$ and, further, in accordance with the frequency of the clock pulses on each of the clock pulse leads. This continues until the count is passed through transfer gate 27 to $n$th register 22 and until the count in register 22 is so modified by the clock pulses from lead $F_n$ that a predetermined sum of clock pulses is attained. Thereupon, with register 22 reaching this predetermined sum, all of the input leads to gate 28 are enabled and the gate produces the previously described output pulse.

As described above, It is apparent that the count of $n$th register 22 is the sum of pulses counted during $n$ cycles of wave $E_o$. Accordingly, $n+1$ clock sources must be selected such that the sum of pulses M is obtained as follows:

$$(f_0)(\tau_{i(k)}-\tau_{(k)})+(f_1)(\tau_{(k+1)}) +(f_2)(\tau_{(k+2)}+ \ldots (f_n)(\tau_{(k+n)})=M \qquad (8)$$

The equation is normalized by letting $$F_j=f_j/f_n \qquad (9)$$

where $$j=0, 1 \ldots n \qquad (10)$$

It is noted that the cycle-by-cycle average voltage $v$ of any cycle interval of $E_o$ expressed as a fraction with unity as the maximum possible voltage is given by $$v_{(k+j)}=\frac{\tau_{(k+j)}}{\tau_{i(k)}} \qquad (11)$$

and incorporating these substitutions in Equation 8 gives $$v_{(k+n)}+F_{n-1}v_{(k+n-1)}+ \ldots +F_1v_{(k+1)} -F_0v_{(k)}=2MF_i-F_0 \qquad (12)$$

where $$2F_i=(2f_i)\left(\frac{1}{f_n}\right)=\left(\frac{1}{\tau_i}\right)\left(\frac{1}{f_n}\right) \qquad (13)$$

and $f_i$ is the frequency of the input signal wave $E_j$.

Since the system will be ultimately phase-locked, the average voltage of each cycle of wave $E_o$ will be the same as any other cycle for a constant input frequency, $f_j$. Thus, the average voltage of any cycle may be represented by voltage V and substituting in Equation 12, there is obtained:

$$V+(F_{n-1})(V)+ \ldots F_1V-F_0V=2MF_i-F_0 \qquad (14)$$

Factoring out V, the following relationship is obtained:

$$V=\left(\frac{2M}{1+F_{n-1}+ \ldots F_1-F_0}\right)(F_i)-\frac{F_0}{1+F_{n-1}+ \ldots F_1-F_0} \qquad (15)$$

Equation 15 provides a relationship between the voltage V and the input frequency $f_i$ in the form of the well known straight line formula, thereby designating the desirable portion of a discriminator curve. Where V is equal to zero, this straight line equation is defined by the point $$F_i=F_0/2M \qquad (16)$$

At V equal to unity $$F_i=\frac{1+F_{n-1} \ldots +F_1}{2M} \qquad (17)$$

Thus, the discriminator characteristic takes the form of a straight line from the point where V is equal to unity, defined by Equation 17, to the point where V is equal to zero, defined by Equation 16.

A second-order phase-locked loop can be designed by simply making $n$ equal to 2 in Equation 12. The following equation is thus obtained:

$$V_{(k+2)}+F_1V_{(k+1)}-F_0V_{(k)}=2MF_i-F_0 \qquad (18)$$

The coefficients in Equation 18 are preferably determined using $z$ transform methods. In particular, the following transform pairs can be readily derived:

$$Z(A)=A\frac{Z}{Z-1} \qquad (19)$$

$$Z[V_{(k+1)}]=Z[V_{(z)}-V_{(0)}] \qquad (20)$$

$$Z[V_{(k+2)}]=Z^2[V_{(z)}-V_{(0)}]-ZV_{(1)} \qquad (21)$$

where A is an arbitrary constant.

Incorporating these pairs in Equation 18, the following expression is obtained:

$$Z^2[V_{(Z)}-V_{(0)}]-ZV_{(1)}+F_1Z[V_{(Z)}-V_{(0)}]-F_0V_{(Z)}=[2MF_i-F_0]\frac{Z}{Z-1} \quad (22)$$

This can be modified as:

$$[Z^2+F_1Z-F_0]V_{(Z)}=[2MF_i-F_0]\frac{Z}{Z-1}+[F_iZ+Z^2]V_{(0)}+[Z]V_{(1)} \quad (23)$$

In synthesizing a second-order phase-locked loop which has the response of a Butterworth low-pass filter, for example, with a cutoff frequency at $\omega_c$, the loop's characteristic equation may be assumed as $$s^2+\sqrt{2}\omega_c s+\omega_c^2=0 \quad (24)$$

where $$s=\sigma+j\omega \quad (25)$$

where $\sigma$ is the real part of the complex frequency $s$, $j\omega$ is the imaginary part and $\omega$ is the radian frequency $2\pi f$.

The poles in the $s$ plane are at $$s_{1,2}=\frac{\omega_c}{\sqrt{2}}(-1\pm j) \quad (26)$$

The corresponding poles in the $z$ plane are $$z_{1,2}=\epsilon^{s\tau_i}=\epsilon^{\frac{\omega_c\tau_i}{\sqrt{2}}(-1\pm j)}=\epsilon^{-\alpha}\cos(\alpha)\pm j\epsilon^{-\alpha}\sin(\alpha) \quad (27)$$

where $$\alpha=\frac{\omega_c\tau_i}{\sqrt{2}}=\frac{2\pi f_c}{2\sqrt{2}}=\frac{\pi}{\sqrt{2}}\frac{f_c}{f_i} \quad (28)$$

Thus $(z-z_1)(z-z_2)=z^2-(2\epsilon^{-\alpha}\cos\alpha)z+\epsilon^{-2\alpha}$ (29)

If the coefficients of Equation 29 are identified with those of Equation 23, the normalized frequencies are found to be:

$$F_1=\frac{f_1}{f_2}=-2\epsilon^{-\alpha}\cos\alpha \text{ and } F_0=\frac{f_0}{f_2}=-\epsilon^{-2\alpha} \quad (30)$$

A third equation is arrived at by fixing the steady-state voltage $V_{(k)}$ for some particular input frequency $f_i$. The choice is arbitrary, and since the system's input spectrum is symmetrical about the carrier frequency $f_m$, it seem logical to fix the corresponding output voltage at 0.5 for an input frequency $f_m$.

Therefore, we attain from Equation 15 the following relationship:

$$V=\frac{2M}{1+F_1-F_0}F_m-\frac{F_0}{1+F_1-F_0} \quad (31)$$

It therefore follows that $$\frac{1}{2}=\left(\frac{2Mf_2}{f_2+f_1-f_0}\right)\left(\frac{f_m}{f2}\right)-\frac{f_0}{f_2+f_1-f_0} \quad (32)$$

Solving (30) and (32) simultaneously gives:

$$f_2=\frac{4Mf_m}{1+F_1+F_0}=-\frac{2Mf_m\epsilon^{\alpha}}{\cos(\alpha)-\sinh(\alpha)} \quad (33)$$

$$f_1=\frac{4Mf_m\cos(\alpha)}{\cos(\alpha)-\sinh(\alpha)} \quad (34)$$

$$f_0=\frac{2Mf_m\cos(\alpha)}{\cos(\alpha)-\sinh(\alpha)} \quad (35)$$

Figure 4:
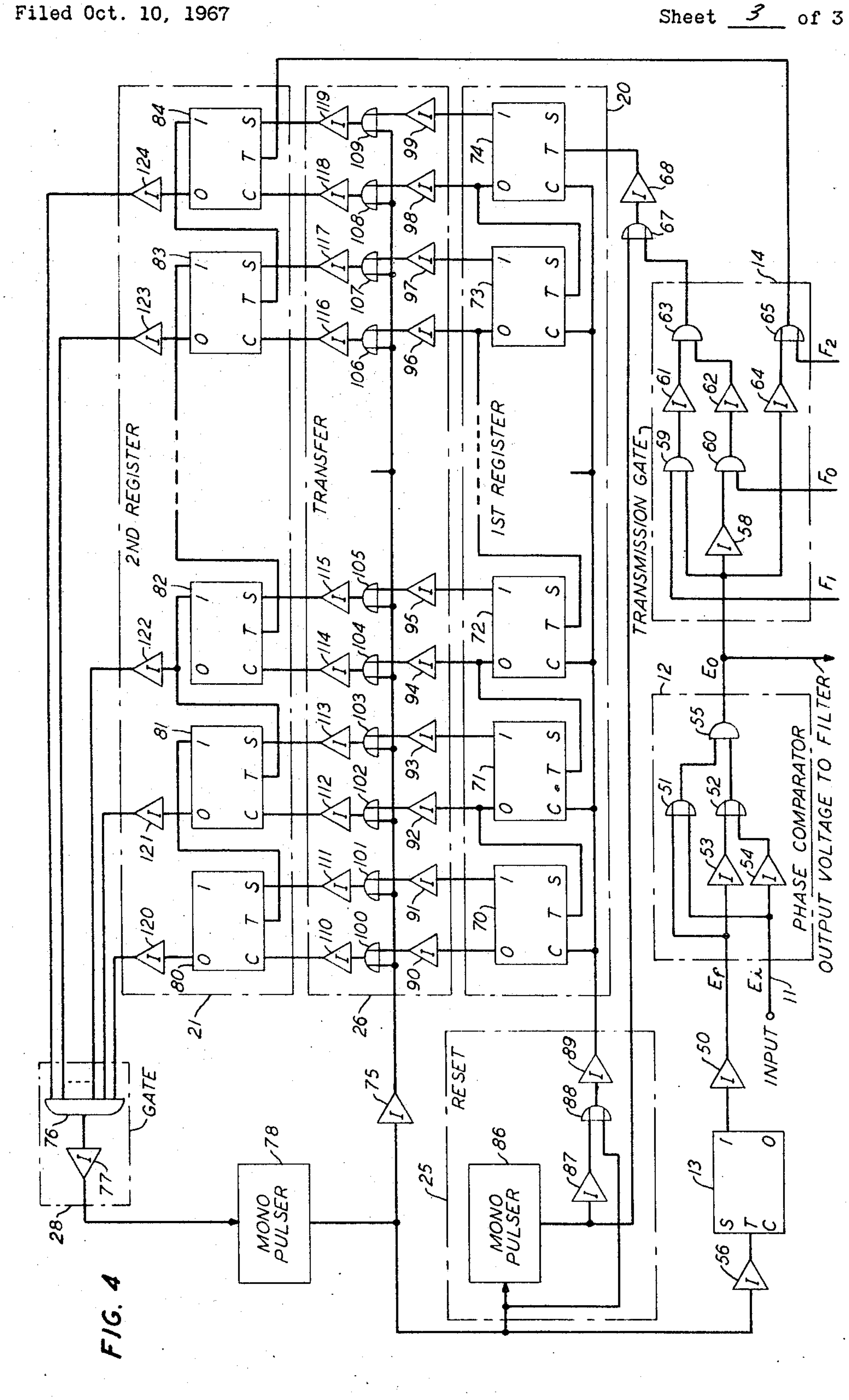
FIG. 4 discloses, in schematic form, a phase-locked loop whose response obeys a second order linear difference equation.

An arrangement for realizing a second-order phase-locked loop is shown in FIG. 4. It consists of an arrangement similar to the circuit previously described in FIG. 1. It includes phase comparator 12 which, in this case, comprises an EXCLUSIVE-OR circuit. In addition, the loop is provided with transmission gate 14 and a counter, which is a modified form of counter 10 in FIG. 1. This counter consists of first register 20, second register 21, flip-flop 13, gate 28, reset circuit 25 and transfer circuit 26, all of which are similarly shown in block form in FIG. 1.

As a practical example, the incoming signal on input line 11 comprises a narrow-band frequency-shift wave whose spectrum is centered about a carrier of 2,125 Hz. The signaling rate is limited to within 300 baud so that a cutoff frequency of 250 Hz. is adequate. A suitable choice of M, considered against baseband jitter which can be tolerated and added circuitry for higher clock frequencies, is 128 pulses. Thus, from Equation 28 it can be seen that $\alpha$ is equal to 0.262. Therefore:

$$f_0=598\ k\text{Hz.}$$
$$f_1=1504\ k\text{Hz.}$$
$$f_2=-1012\ k\text{Hz.} \quad (36)$$

The negative value for $f_2$ indicates that second register 21 necessarily provides a down-count from the sum derived from first register 20.

Considering first EXCLUSIVE-OR circuit 12, the inputs thereof comprise wave $E_i$ on line 11 and wave $E_f$, derived from the output of inverter 50. When waves $E_i$ and $E_f$ are low, the output of OR gate 51 is low, disabling AND gate 55. When either or both of the input waves are high, OR gate 51 applies an enabling signal to AND gate 55. If both waves are high, inverters 53 and 54 provide low outputs whereby OR gate 52 disables AND gate 55. Accordingly, AND gate 55 is enabled only in the event that either wave $E_f$ or wave $E_i$ is high but is disabled in the event that both waves $E_f$ and $E_i$ are high.

The output wave $E_0$ of EXCLUSIVE-OR circuit 12 is passed to transmission gate 14 and to the output of the phase-locked loop which, as shown in FIG. 1, comprises low-pass filter 29.

Considering transmission gate 14, with output wave $E_0$ of EXCLUSIVE-OR circuit 12 low, inverter 58 enables AND gate 60. Accordingly, the clock pulses on lead $F_0$ are passed through AND gate 60 and inverter 62 to AND gate 63. Concurrently, with wave $E_0$ low, the output of AND gate 59 is low. Thus, inverter 61 applies an enabling potential to AND gate 63. Accordingly, the clock pulses on lead $F_0$ are passed through AND gate 63 and, thus, passed by the output of transmission gate 14 to OR gate 67.

When wave $E_0$ is high AND gate 59 is enabled, thus passing the clock pulses on lead $F_1$. These clock pulses are therefore passed through inverter 61 to AND gate 63. Concurrently, inverter 58 disables AND gate 60 whereby inverter 62 passes an enabling potential to AND gate 63. Therefore, with wave $E_i$ high, the clock pulses on lead $F_1$ are passed to the output of transmission gate 14 and then to OR gate 67. Assuming that OR gate 67 is not disabled, the clock pulses from AND gate 63 are applied through inverter 68 to first register 20.

In addition to passing clock pulses from lead $F_1$, wave $E_0$ in the high condition also applies a low signal to OR gate 65 by way of inverter 64. This enables OR gate 65 to pass clock pulses on lead $F_2$ to second register 21. Of course, when wave $E_0$ is low, inverter 64 applies a high signal to OR gate 65 which, in turn, produces a high signal at the output thereof. This effectively blocks the clock pulses on lead $F_2$.

Considering now first register 20, it comprises ten flip-flops, of which flip-flops 70 through 74 are shown. Each flip-flop is cleared by a high signal condition applied to its clear input and flipped by a positive-going transition applied to its toggle input. When the flip-flop is in the set condition, output terminal "1" of each flip-flop is high and, conversely, when the flip-flop is in the clear condition, output terminal "0" is high. Output terminal "0" of each flip-flop is connected to the toggle input of each succeeding flip-flop. Therefore, as is well known in the art, the flip-flops are connected together in a well known up-counter arrangement, providing a binary count at the outputs thereof. It is noted that inverter 68, which produces the clock pulses derived via OR gate 67 from leads $F_0$ and $F_1$, is connected to the toggle input of the first flip-flop 74. This permits first register 20 to count the clock pulses from leads $F_0$ and $F_1$ for the purpose previously described with respect to FIG. 1.

Second register 21 comprises ten flip-flops, of which flip-flops 80 through 84 are shown. It is noted that ten flip-flops are employed to provide a count of 1,024, which is eight times the clock pulse sum previously deemed convenient. This is required to provide stable operation. Flip-flops 80 through 84 are substantially identical to flip-flops 70 through 74. The output terminal "1" of each flip-flop, however, is connected to the toggle input of the next consecutive flip-flop, thereby arranging the stages as a down-counter, as is well known in the art. It is noted that OR gate 65 of transmission gate 14 extends to the toggle input of the first flip-flop stage 84. It is further noted that the clear and set inputs of each flip-flop in register 21 are connected to transfer circuit 26. This permits second register 21 to accept the number transferred from first register 20 by way of transfer gate 26 and, further, to down-count from that number the clock pulses on lead $F_2$ for the purpose previously described with respect to FIG. 1. Second register 21 also includes inverters 120 through 124, which inverters accept the binary number provided to output terminals of flip-flops 80 through 84. The outputs of inverters 120 through 124 extend to gate 28.

Transfer gate 26 includes inverters 90 through 99, OR gates 100 through 109 and inverters 110 through 119. One input to OR gates 100 through 109 extends to the output of inverter 75. The other input to OR gates 100 through 109 extends to the output of inverters 90 through 99, respectively. The outputs of OR gates 100 through 109 are connected to the inputs of inverters 110 through 119, respectively. The inputs of inverters 90 through 99 are connected to the output of first register 20.

Specifically, considering for example flip-flop 70, output terminal "0" is connected through inverter 90 to OR gate 100 and output terminal "1" is connected through inverter 91 to OR gate 101. Accordingly, inverters 90 through 99 pass the output number of register 20 to OR gates 100 through 109. OR gates 100 through 109 are normally disabled, however, by the high output of inverter 75. This high output is passed to inverters 110 through 119, which, in turn, apply a low signal to register 21. When the output of inverter 75 goes low, however, as described hereinafter, the number stored in register 20 is passed through OR gates 100 through 109 to inverters 110 through 119 and thence to the clear and set inputs of flip-flops 80 through 84 of the second register 21.

Gate 28 advantageously comprises OR gate 76 and inverter 77. When second register 21 stores the number 128, output terminal "1" of flip-flop 82 is high and output terminals "0" of all the other flip-flops are high. Thus, inverters 120 through 124 all apply low inputs to OR gate 76. Accordingly, the output of OR gate 76 is low only in the event that register 21 is storing the number 128. At this time inverter 77 applies an enabling signal to monopulser 78. The monopulser, in turn, passes a pulse to the output thereof, which pulse is concurrently applied to inverter 75, reset circuit 25 and inverter 56.

The application of the pulse to inverter 56 passes, in turn, an inverted pulse to the toggle input of flip-flop 13. A positive-going transition occurs at the termination of the inverted pulse whereby the condition of flip-flop 13 is flipped. This inverts the output of inverter 50, thus producing wave $E_f$.

Reset circuit 25 comprises monopulser 86, OR gate 88 and inverters 87 and 89. The pulse provided by monopulser 78 is applied to monopulser 86, which, in turn, provides a pulse at its output. The pulse provided by monopulser 86 is arranged to start concurrently with the pulse from monopulser 78. The pulse from monopulser 86, however, is arranged to prevail after the pulse from monopulser 78 expires. Thus, prior to the generation of the two pulses the output of monopulser 86 is low and inverter 87 passes a high signal through OR gate 88 to inverter 89. Inverter 89, therefore, applies a low signal to first register 20 and, more specifically, to the clear inputs of flip-flops 70 through 78.

When monopulser 78 generates its pulse which is applied through OR gate 88, this maintains the output of inverter 89 low. The concurrent pulse provided by monopulser 86 drives the output of inverter 87 low, removing the high condition it applies through OR gate 88 to inverter 89. Therefore, when the pulse from monopulser 78 expires, removing the high condition it applies to OR gate 88, the output of inverter 89 goes high. This high condition exists for the remaining portion of the pulse from monopulser 86. The high signal condition produced by inverter 89 resets first register 20, the resetting occurring after the termination of the pulse from monopulser 78.

The pulse from monopulser 86 is also passed to OR gate 67. This high condition on OR gate 67 maintains the input of inverter 68 high. Thus, the clock pulses from lead $F_0$ and $F_1$, which pulses are applied through AND gate 63 to OR gate 67 as previously described, are effectively blocked for the duration of the pulse from monopulser 86. This permits register 20 to be cleared or reset prior to the re-application of the clock pulses.

The output of monopulser 78 is also applied to inverter 75, as previously described. Accordingly, the transfer of the number from register 20 to register 21 occurs during the generation of the pulse from monopulser 78. Thus, it is seen that the transfer of the number takes place followed by the resetting of register 20, during which intervals the clock pulses to register 20 are blocked. It is thus seen that, as described in FIG. 1, incoming wave $E_1$ is compared in phase with feedback wave $E_f$ by EXCLUSIVE-OR circuit 12 which generates output wave $E_0$. Wave $E_0$, in turn, controls transmission gate 14 to pass clock pulses to registers 20 and 21. The output of register 21 is monitored by gate 28 which, when a predetermined number or sum of clock pulses is attained, operates monopulser 78 which, in turn, effects the transfer of the number from register 20 to register 21, operates reset circuit 25 to clear register 20 and flips flip-flop 13 to cause the transition of output wave $E_f$.

Figure 3:
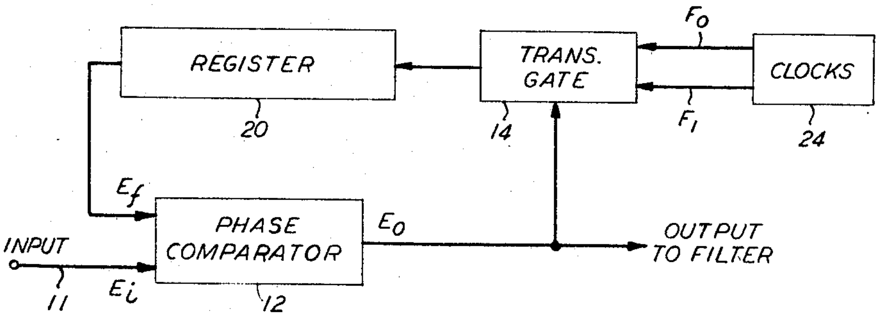
FIG. 3 discloses a simple form of a first order phase-locked loop in accordance with this invention.

A simple form of a first-order phase-locked loop is shown in FIG. 3. This loop simply includes EXCLUSIVE-OR circuit 12, clock sources 24, transmission gate 14 and register 20. The circuit is arranged to operate in substantially the same manner as the phase-locked loop shown in FIG. 1 with the exception that a single register is employed and the output of the last stage of the counter provides wave $E_f$. The output of the phase-locked loop is derived from output wave $E_0$ of EXCLUSIVE-OR circuit 12, and passed through a low-pass filter, such as low-pass filter 29 shown in FIG. 1. Since only a simple first-order loop is provided, clock source 24 is only arranged with two clock sources, providing clock leads $F_0$ and $F_1$. In addition, since the flipping of the last stage of register 20 occurs concurrently with the resetting of the register and, further, since only one register is employed, a reset circuit, such as reset circuit 25, and a transfer circuit, such as transfer circuit 26, both shown in FIG. 1, are not necessary for the phase-locking loop of FIG. 3. Similarly, since the output $E_f$ is derived from the last stage of register 20, a gate circuit, such as gate 28 shown in FIG. 1, need not be utilized.

Although a specific embodiment of this invention has been shown and described, it will be understood that various modifications may be made without departing from the spirit of this invention.

What is claimed is:

1. A phase-locked loop for locking the phase of the output of a wave generator to the phase of an incoming signal including a phase comparator for generating a binary signal output having an average amplitude which varies with the difference in phase between said incoming signal and said wave generator output, said wave generator being controlled by the amplitude of said output signal for modifying the frequency of said wave generator output characterized in that said wave generator includes a source of clock pulses having a plurality of pulse repetition rates, means for alternatively selecting rates to be effective in accordance with the alternative binary conditions of said output signal, means for counting said clock pulses having said effective rates, and means responsive to said clock pulse count for producing said wave generator output.

2. A phase-locked loop in accordance with claim 1 wherein said counting means comprises a plurality of successive counters, means for advancing said counters in response to said clock pulses and means for transferring the count designating the advance of each counter to the next successive counter during each successive cycle of said incoming signal.

3. A phase-locked loop in accordance with claim 2 wherein said means for producing said wave generator output includes means responsive to the advance of a final one of said successive counters.

4. A phase-locked loop in accordance with claim 3 wherein said transferring means is enabled when said final counter advances to a predetermined count.

5. A phase-locked loop in accordance with claim 2 wherein said transferring means includes means for resetting an initial one of said counters at the same time as the count transfers occur.

6. A phase-locked loop for locking the phase of the output of a wave generator to the phase of an incoming signal with a response to a step in the frequency of the incoming signal obeying a linear *n*th order equation comprising, a phase comparator for generating an output signal having an amplitude which varies with the difference in phase between the output of the wave generator and the incoming signal, said wave generator being controlled by the amplitude of said phase comparator output signal for modifying the frequency of said wave generator output, characterized in that the wave generator includes *n* successive counters, clock pulse means for advancing said successive counters, means controlled by the amplitude of said phase comparator output signal for varying the repetition rate of said clock pulse means, and transfer gate means effective for each wave generator output cycle for transferring the count designating the advance of each counter to the next successive counter.

7. A voltage controlled wave generator having an output wave which is modified in frequency under control of a digital input signal comprising:

*n* successive counters, clock pulse means for advancing successive ones of said counters during corresponding successive input signal cycles, means controlled by said digital input signal for varying the repetition rate of said clock pulse means, means responsive to the advance of a final one of said counters for producing said output wave, and transfer gate means responsive to said output wave for transferring the count designating the advance of each counter to the next successive counter whereby the final one of said counters accumulates a count relating to the average amplitude of said digital input signal for *n* successive cycles.

8. A phase-locked loop for locking the phase of the output of a pulse generator to the phase of an incoming pulse signal comprising:

a phase comparator for producing a binary signal indicating the concurrent conditions of said incoming pulse signal and said pulse generator output, a source of clock pulses having at least two pulse repetition rates, means responsive to each binary condition of said binary signal for selecting one of said two rates, means for counting said clock pulses having the selected rates, and means responsive to said count for producing said pulse generator output.

References Cited

UNITED STATES PATENTS

| | | | |
|---|---|---|---|
| 3,130,376 | 4/1964 | Ross | 331—18 |
| 3,165,706 | 1/1965 | Sarratt | 331—18 |
| 3,344,361 | 9/1967 | Granqvist | 331—18 |
| 3,354,403 | 11/1967 | Thomas | 331—25 X |

ROY LAKE, *Primary Examiner.*

S. H. GRIMM, *Assistant Examiner.*

U.S. Cl. X.R.

331—25, 34